United States Patent [19]

Conner

[11] Patent Number: 4,462,644

[45] Date of Patent: Jul. 31, 1984

[54] BEARING UTILIZING HELICAL INSERT

[76] Inventor: Jack S. Conner, 22190 Saddle Peak Rd., Topanga, Calif. 90290

[21] Appl. No.: 495,444

[22] Filed: May 17, 1983

Related U.S. Application Data

[63] Continuation-in-part of Ser. No. 235,835, Apr. 10, 1981, abandoned.

[51] Int. Cl.$^3$ ............................................. F16C 33/58
[52] U.S. Cl. ................................ 308/207 R; 308/179; 308/216
[58] Field of Search ................. 308/207 R, 216, 240, 308/179, 179.5; 384/294, 301

[56] References Cited

U.S. PATENT DOCUMENTS

| | | | |
|---|---|---|---|
| 640,059 | 12/1899 | Whitney | 308/216 |
| 969,763 | 9/1910 | Newmann | 308/216 |
| 1,122,987 | 12/1914 | Myers | 308/216 |
| 1,205,449 | 11/1916 | Hart | 308/216 |
| 4,231,623 | 11/1980 | Kaufman . | |

Primary Examiner—Lenard A. Footland

Attorney, Agent, or Firm—K. H. Boswell; Edward D. O'Brian

[57] ABSTRACT

An improvement for a low frictional connection between a first element and a second element wherein one of the elements rotates with respect to the other, such as a crankshaft and a connecting rod, includes the addition of a helical member located between the elements. One of the elements i.e., a crankshaft, would include a convex journal surface and the other element i.e., a connecting rod, would include a concave receptacle surface. The helical member is located around the journal surface. A bearing is positioned between the two elements directly adjacent to the helical member and moves against the helical member. The helical member is capable of being hardened and/or machined such that it presents a low frictional surface for the bearing to move against. Since the helical member is not an integral part of either of the elements it is capable of being replaced such that catastrophic marring of its low frictional surface either during manufacture or use does not require replacement of one of the elements but only requires replacement of the helical member.

29 Claims, 10 Drawing Figures

BEARING UTILIZING HELICAL INSERT

CROSS REFERENCE TO RELATED APPLICATIONS

This application is a continuation in part of my prior filed application entitled "BEARING UTILIZING HELICAL INSERT", Ser. No. 252,835, filed Apr. 10, 1981, abandoned, the entire contents of which are herein incorporated by reference.

BACKGROUND OF THE INVENTION

This invention is directed to a low frictional connection between two elements of the type wherein one is capable of rotation with respect to the other. A low frictional surface is formed on a helical member and inserted between the two elements. A bearing riding against this low frictional surface provides for a low frictional connection between the two elements. The helical member is capable of being easily replaced should its low frictional surface be compromised in any manner.

With the development of engines, motors, transmissions and other similar mechanical elements which utilize rotating shafts, cranks, and the like, the need for low frictional connections between such rotating shafts and their support and/or elements connected to them, has led to the development of two major types of bearings. These two types are sliding bearings and roller bearings.

Both sliding bearings and roller bearings require smooth machined surfaces to work against. This in the internal combustion engine working attachment of the connecting rods to the crankshaft requires machining to tolerances of each of the crankpin journal surfaces to which the connecting rod connects as well as the same treatment on the main bearing journal surfaces on the crankshaft wherein the crank is supported within the engine case. When sliding bearings are utilized to connect either the connecting rod to the crankshaft or the crankshaft to the case, the sliding bearing is usually of the type having a split cylindrical bushing, sleeve or insert located around the machined journal surface. On the connecting rods the inserts are held in place against motion by an appropriate opening formed in part of the connecting rod and in part in a rod cap fitting on the end of the rod. The main bearing bushings are also held captive in appropriate openings in the matching parts of the engine case to prevent motion.

In smaller engines, typically needle bearings are used to provide an anti-friction bearing surface between the crankshaft and the connecting rod or engine case. The needle bearings reduce weight and provide for a through flow of lubricant between the crankshaft and the inside of the connecting rod journal or bearing race parallel to the needle rollers. When needle bearings are used the line of contract provides such operating loads that the contact surfaces of the crankshaft, connecting rod or bearing race must be hardened and ground. Hardening of the contact surfaces on the crankshaft usually requires copper plating of the whole crankshaft then a grinding through the copper in only those regions where the hardening is to take place. This is then followed by a final finish grind. This results in a shaft which is partially ductile and partially hardened. The resultent boundary line between these two conditions represents the ultimate failure line for the crankshaft.

Bearing races and to an extent the connecting rod and its cap are inexpensive to produce and harden compared to crankshafts for the following reasons. Only one anti-friction surface needs to be formed on the bearing race or within the connecting rod and its cap. If for some reason during manufacture or during use this surface is catastrophically destroyed by marring, undersizing or the like the race or connecting rod could be disposed of without incurring too great an economic loss. Crankshafts, on the other hand, contain a plurality of journal surfaces. The crankshaft is initially forged or built up and then the journal surfaces must be hardened and machined. A typical four cylinder engine would require the crankshaft to have four journal surfaces for the connecting rods and at least two but more commonly three surfaces for the main bearings wherein the crankshaft is supported in the case. Thus at a minimum six surfaces must be hardened and machined on a typical four cylinder engine crankshaft. If during machining one of these surfaces is catastrophically destroyed for one reason or the other the whole crankshaft is rendered useless. The unuseable surface may be the first surface machined or it may be the sixth surface or any surface inbetween. If it is the second to the sixth surface, of course, all prior work in machining the previous surfaces is all for naught. Having to scrap a partially prepared crankshaft is a very expensive endeavor for the manufacturer.

Aside from manufacturing it is also sometimes necessary to regrind the journal surfaces of crankshafts in repairing engines. Such regrinding requires removal of a portion of the journal surface. It is, of course, evident that there is a limit to the amount of material that can be ground off of this journal surface. For reasons of strength and dynamic balance any particular journal surface must be within certain tolerances with the other surfaces. This then forms a situation exactly analogous to the manufacturer's situation noted above.

In view of the above it is evident that there exists a need for new and improved low frictional connections between rotating mechanical elements such as a crankshaft and a connecting rod. Further, it is considered that there exists a need for new and improved low frictional connection between elements which increases the lubrication at the contact points between said elements and thus even further reduces the frictional forces between the elements as they rotate. It is also considered that there exists a need for forming a hardened ground surface on the journals of crankshafts such that the surface on each individual journal of a multiple journal crankshaft can be individually and independently prepared or replaced. Additionally, it is considered that there exists a need for a crankshaft having homogeneous malleability throughout while still including hardened surfaces on its journals.

BRIEF DESCRIPTION OF THE INVENTION

In view of the above it is an object of this invention to provide for a low frictional connection between moving elements which is of such a nature that it is originally economically manufactured and can be easily and conveniently incorporated onto more expensive machine parts such that errors in manufacture of low frictional surfaces on these more expensive machine parts can be eliminated. It is a further object to provide a low frictional connection between moving elements which provides for convenient replacement of the low frictional surfaces between the elements during repair of a machine without subjecting costly elements of that machine to processes wherein they may be damaged during repair. It is an additional object to provide for a low frictional connection between moving elements of a machine which provides for additional pathways of lubrication during operation of the machine thus even further lowering the frictional forces between the moving elements. Additionally, it is an object of this invention to provide a crankshaft which does not vary between ductile zones and hardened zones yet still provides for hardened bearing contact surfaces.

These and other objects as will become evident from the remainder of this specification are achieved in an apparatus for a low frictional connection between a first element rotating with respect to a second element which comprises: said first element including a cylindrical convex journal surface; said second element including a cylindrical concave receptacle surface; said convex journed surface sized to fit into said concave receptacle surface and when fitting into said receptacle surface being spaced away from said receptacle surface; a helical member having an internal concave helical surface and an external convex helical surface and said internal and said external helical surfaces forming portions of concentric right circular cylinders, said helical member sized to fit around said journal surface and within said receptacle surface; said internal helical surface abutting against said journal surface, said external helical surface and said receptacle surface coaxial with each other and spaced away from each other forming a gap between each other; a bearing means fitting into said gap and movably located against said helical member to provide a working connection between said first and said second element, said bearing means and said helical member moving with respect to one another in response to rotational movement of said first and said second elements with respect to one another.

The bearing means can comprise anti-friction bearings such as roller bearings, preferredly needle bearings, or can be in the form of split cylindrical bushing bearings. With the use of roller bearings the receptacle surface would be appropriately treated to act as an outer bearing race for the roller bearing or a separate bearing race could be inserted over the roller bearings fitting within the receptacle surface. In any event the helical member would provide one of the surfaces on which the roller bearings travel on. The spaces between the roller bearings, preferredly needle bearings, would provide for axial lubrication flow and the void space between the individual coils of the helical member would provide for a second lubrication channel located almost traversely to the axial lubrication channel.

Both a first and a second helical member could be provided. One of the helical members would fit around the journal surface such that its external helical surface would be available for contact against the bearing means and the other helical member would fit into the receptacle surface such that its internal helical surfaces would be available for contacts against the bearing means. The bearing means would be positioned between the two helical members positioning the external helical surface of the one helical member and the internal helical surface of the second helical member in position to provide for low frictional contact against the bearing means located between the two helical members.

The helical member can be formed to include both a left handed revolution section and a right handed revolution section. Such a helical member as such would be di-directional. The use of such a bidirectional helical member would result in a pumping action of lubricant from the respective sides of the journal surface toward the center. The bi-directional helical member could be integrally formed with both the left and right handed revolution sections connected together approximately near the center of the helical member. Alternately, the right and left handed revolution sections could be formed as separate elements which together comprise the helical member.

With either an uni-directional helical member having single left or right handed revolving coils or a bi-directional helical member having both right and left handed revolving coils, an engaging means can be integrally formed on the helical member to form a portion thereof. A corresponding engagable means would be formed on the element on which the journal surface is located. Preferredly the engagable means would comprise an aperture located in the element and the engagement means would comprise a projecting means formed on a helical member. The helical member would be held against rotation on the journal surface by fitting of the projection means into the aperture means. As shown in the ilustrative embodiments herein the projection means would comprise a tang integrally formed on the helical member with the aperture means comprising an aperture drilled into the element on which the journal surface is located.

For an uni-directional helical member a single tang would be sufficient to retain the helical member against rotation on the journal surface. For a bidirectional helical member, which is an integrally formed one piece helical member, a single tang would also be sufficient. For a bi-directional helical member having separate left and right handed coil sections an appropriate tang on each section would be utilized with appropriate apertures being formed on the element to receive each tang.

The helical member would be formed of either round coil spring stock or coil spring stock which is quadrilateral in cross-section with at least two parallel sides which would form the internal and external helical surfaces. This coil spring stock would be wound around an appropriate spindle to form the helical member. This could be done as an external operation preforming the helical members or the journal surface of one of the elements could act as the spindle and the helical member formed directly on it by appropriately winding of the stock around the journal. Preferredly the wire stock would have a round cross-section and would be ground to form parallel cylindrical faces with the corners slightly rounded such that no sharp edges are produced on the helical member.

BRIEF DESCRIPTION OF THE DRAWINGS

This invention will be better understood when taken into conjunction with the drawings wherein.

The invention described in this specification and shown in the drawings utilized certain principles and/or concepts as are set forth and claimed in the claims appended to this specification. Those skilled in the mechanical arts will realize that these principles and/or concepts are capable of being utilized in a variety of different embodiments different from the specific embodiment herein described for illustrative purposes. For this reason this invention is not to be construed to being limited to only the illustrated embodiment described herein but is to be construed in light of the claims.

DETAILED DESCRIPTION OF THE INVENTION

The invention described in this spefcification is capable of being utilized wherever one element forms a rotating connection with a second element. The second element can be a fixed element such as an appropriate mounting bracket, engine case or the like wherein the first element is a rotating shaft or the like or the second element could be a moving carriage such as a connecting rod and the like wherein the first element is a rotating member such as a crankshaft and the like.

Generally the invention will be utilized on cylindrical surfaces wherein a cylindrical surface on the first element is mated to a co-cylindrical surface on the second element. For the illustrated embodiment described in this specification right cylindrical surfaces are utilized.

Figures 1, 2, 3:
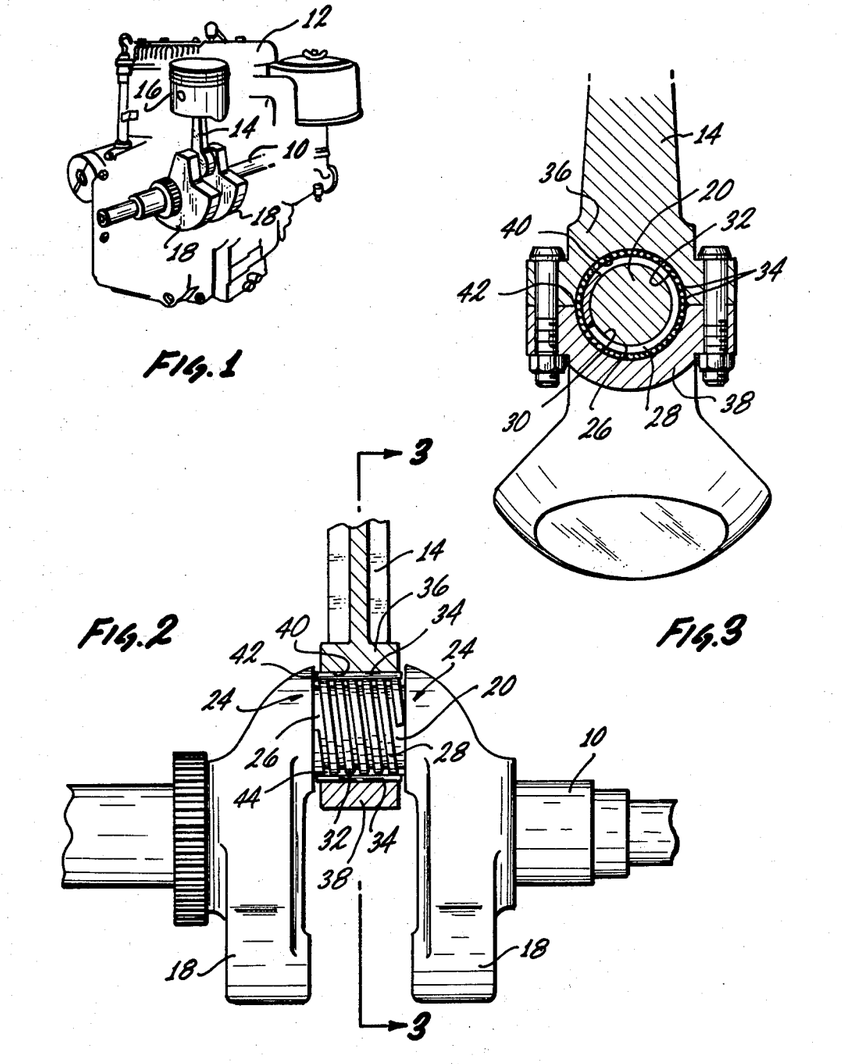
FIG. 1 shows a typical crankshaft, connecting rod and piston located within an engine or case.
FIG. 2 is a side elevational view in partial section showing use of the invention in attaching the large end of a connecting rod to a crankpin journal of a crankshaft.
FIG. 3 is an end elevational view in section taken about the line 3—3 of FIG. 2.

For purposes of illustration in FIG. 1 there is shown a crankshaft 10 appropriately mounted in an engine case 12 and having attached thereto a connecting rod 14 which in turn carries a piston 16. The connecting rod 14 could be considered as a movable carriage appropriately rotatively attaching to the crankshaft 10. For this specification therefore the crankshaft 10 would comprise a first element and the connecting rod 14 a second element which move with respect to one another. In this case the first element, the crankshaft 10, rotates within the second element, the connecting rod 14.

Figure 5:
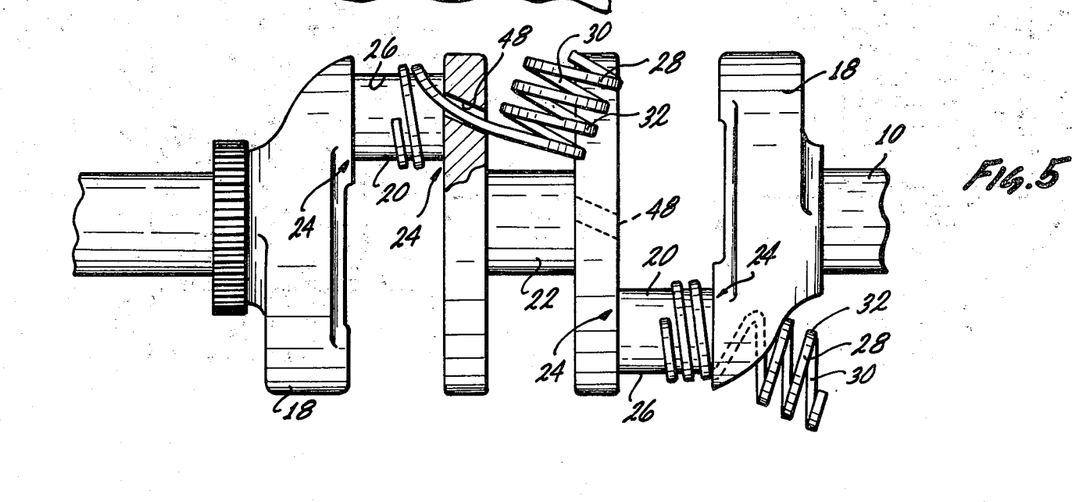
FIG. 5 is a side elevational view in partial section showing insertion of one of the components of the invention onto a crankshaft, two methods of insertion being shown, one on the left and right hand sides, respectively.

Normally a crankshaft is a unified body formed by forging, or built up of specific units, such that it has appropriate component areas which include counter weights collectively identified by the numeral 18 in FIG. 5, crankpins collectively identified by the numeral 20 in FIG. 5 and crank arms collectively identified by the numeral 24 in FIG. 5. For the purposes of the remainder of this specification the crankpins and the crank journal 20 and 22 respectively will be collectively considered to both incorporate a convex journal surface 26. As forged, the journal surfaces 26 would be appropriately formed as right circular cylindrical surfaces of revolution. After forging, these journal surfaces 26 could be roughly ground to remove any forging imperfections. However, since these surfaces will not have to be hardened as in present practice for needle bearing crankshaft technology this rough grinding does not require the tolerances and/or include the problems associated with grinding to explicit tolerances. Minor imperfections or marring of these surfaces will not render the crankshaft unuseable as does present crankshaft technology.

A helical member 28 is formed as hereinafter described and fits around the journal surface 26. Preferredly the helical member 28 would be formed as a separate component and inserted onto the journal surface 26. In any event the helical member 28 appropriately fits around the journal surface 26 such that the internal surface 30 of the helical member 28 abuts against and is carried on the journal surface 26. The external surface 32 of the helical member is now positioned in a co-cylindrical manner with the journal surface 26.

As appropriate bearing means, in the illustrative embodiment herein, a plurality of needle bearings 34, are appropriately positioned around the external surface 32 of the helical member 28. The needle bearings 34 would lie along the longitudinal axis of the crank arm 24 as is illustrated in FIG. 2. The large end 36 of the connecting rod 14 and the rod cap 38 are positioned around the needle bearings 34 and form a receptacle surface 40 or bearing race about the needle bearings 34. The rod cap 38 is appropriately held to the large end 36 of the rod in the conventional manner utilizing bolts, nuts or cap screws not separately numbered. When assembled, the large end 36 of the connecting rod 14 and its rod cap 38 fit around the needle bearings 34 which in turn fit around the helical member 28 by abutting against its external surface 32. The helical member 28 fits around the journal surface 26 by abutting the internal surface 30 of the helical member against the journal surface 26.

When assembled, as described in the preceeding paragraph, the conventional lubrication grooves collectively identified by the numeral 42 between the individual needle bearings 34 are augmented by a new set of lubrication grooves 44 formed between the individual turns or coils of the helical member 28. The lubrication grooves 44 are positioned almost transverse to the lubrication grooves 42. This provides an additional path for moving lubricant and/or lubricant scavenging across, over and through the contacting surfaces. Such additional lubrication assures that the central areas of the needle bearings 34 receive adequate lubrication. The provision of the lubrication grooves 44 between the individual turns of the helical member 28 also assures that in certain situations where there is no force fed lubrication such with that which would exist within a universal joint, there is a pathway provided for lubrication to the interior of the moving components. Rotation of the helical member 28 causes lubrication to move through the helical member 28 utilizing an Archimedean screw principle.

For the illustrative embodiment in FIGS. 1 through 5 the helical member 28 is formed as a uni-directional spiral advancing along a cylindrical surface. The turns of the helical member 28 all have the same radius, however, these turns move axially to form a helicoid. The pitch of the helix is constant such that the individual coils of the helical member are maintained at a fixed distance from one another. The helical member 28 either can revolve right handed or left handed. Preferredly the helical member revolves in a direction that is opposite to the direction of rotation of the shaft about which it is located. When so located, revolution of the shaft, in fact, tightens the helical member 28 about the shaft. This is deemed advantageous in that by maintaining the coils of the helical member 28 against the journal surface 26 fatiguing of the coils is reduced. Thus in FIGS. 2 and 3 the crankshaft 10 would be designed to revolve counter-clockwise such that pressure of the connecting rod 14 against the helical member 28 would tend to tighten the helical member 28 onto the journal surface 26. It, of course, can be appreciated that if the crankshaft 10 were to revolve clockwise the helical member 28 would be formed such that the individual turns of the helical member 28 would slant oppositely from that as shown in FIG. 2. That is, the tops of the individual coils of the helical member 28 in FIG. 2 would be displaced to the right of the bottoms of the coils as opposed to the tops of the coils being displaced to the left of the bottoms of the coils as illlustrated.

Figure 4:
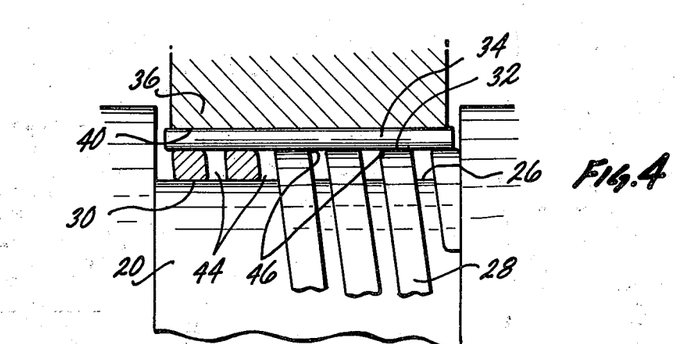
FIG. 4 is a side elevational view in partial section showing in greater detail that area shown in section in FIG. 2.

Preferredly the helical member 28 would be formed of a coil stock which is either quadrilateral in cross-section or is round and has been gound to include parallel faces. The use of round stock results in rounded corners along the parallel faces. As seen in FIG. 4 in cross-section the width of the individual coils is slightly greater than the height. Typically, dimensions would be about 80% height to width ratio. The individual coils are spaced apart from each other by about 30% of the width. Each individual coil would form a part of the internal surface 30 and the external surface 32. These two surfaces would be essentially co-cylindrical with one another after forming from the coil stock and could be ground to more exacting tolerances in the completed helical member 28 if desired.

Figures 6, 7:
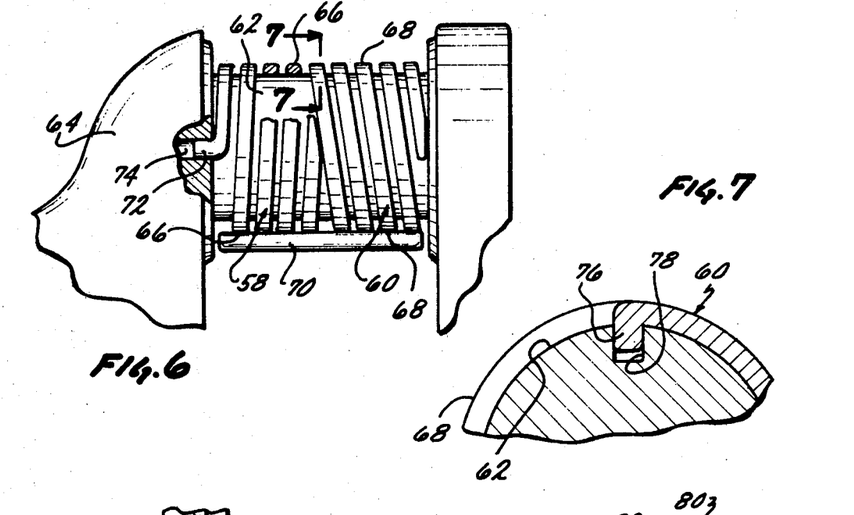
FIG. 6 is a side elevational view in partial section showing a bi-directional helical member located on a portion of a crankshaft.
FIG. 7 is a side elevational view in section about the line 7—7 of FIG. 6.

Normally the corners of the stock forming the helical member 28 would be slightly rounded as is seen in FIGS. 4 and 6. Preferredly, as noted above, by starting out with round stock this effect is achieved without any additional grinding of this area. This provides a smooth surface 46 at each corner and thus no cutting edges would be provided on either the internal surface 30 or the external surface 32 of the helical member 28.

The preferred embodiment of forming the helical member 28 would consist of wrapping the appropriate coil stock around a spindle of the appropriate external diameter to form the appropriate internal diameter of the helical member 28. Once wrapped around the spindle to form the helical member 28, the coil stock would be cut forming the individual helical member of appropriate dimensions. When used as per the illustrative embodiment the internal surface 30 of the helical member could be ground to an undersized dimension to tightly clamp the journal. After grinding the external surface 32 to tolerances the helical member 28 would be appropriately hardened. Such hardening could be done by any conventional method now practiced. It, of course, realized that these steps could be reversed and that a hardened coil stock could be appropriately ground as needed. Hardening would be to appropriate hardness such as Rockwell 90.

Alternately after formation of the helical shape of the helical member 28 internal grinding of the internal surface 32 could be done followed by hardening and locating the helical member 28 over the journal surface 26. Grinding of the external surface 32 to specifications would then be performed with the helical member 28 actually located on the journal surface 26. Such a method of formation, of course, would correct for any ambiguitied in the journal surface 26 such as deviation from perfect roundness and the like. In any event, once located on the journal surface 26 the external surface 32 of the helical member 28 would form a hardened smoothed surface for the needle bearings 24 to roll against.

It can be appreciated that if for some reason or the other the helical member 28 on a particular crank arm or crank journal surface was destroyed, marred or otherwise rendered useless, it can easily be removed and a replacement helical member 28 inserted thereon without affecting the integrity of the remainder of any other helical members located in other positions on a crankshaft 10.

FIG. 5 shows methods of placing the helical member 28 onto different journal surfaces 26 on a crankshaft 10. On the right side of FIG. 5 in those areas wherein portions of the crankshaft did not impede placement of the helical member 28 onto the journal surface 26 the helical member 28 could simply be wound about the crank arm 24 to appropriately located that helical member 28 onto the journal surface 26. Such winding would be done whenever the helical member 28 could be stretched or flexed away from its performed helical shape without exceeding its elastic limit and permanently distorting it. After winding onto the journal surface 26 the helical member would tightly hug the journal surface 26 because of the inherent elasticity of its materials. In those areas where it would not be possible to wind the helical member 28 about the crankshaft 10 or any component thereon, appropriate ports 48 and the like would be provided in the crank arms 24 for insertion of the helical member through the port 48 and winding onto the journal surface 26. Again, such winding would be done in a manner not flexing the helical member 26 beyond its elastic limits such that when it was finally wound onto the journal surface 26 it would assume its helical shape about this journal surface.

Figure 10:
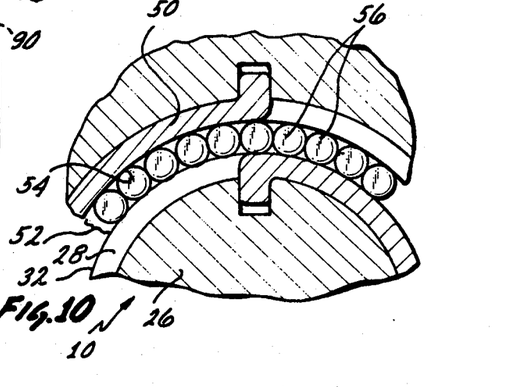
FIG. 10 is another further construction of the invention.

Another further construction of the invention is shown in FIG. 10. In addition to helical member 28 a second helical member 50 is utilized. The first helical member 28 fits appropriately onto the journal surface 26. A second larger helical member 50 would then be appropriately placed around the first helical member and would be sized such that a gap 52 existed between the external surface 32 of the small helical member 28 and the internal surface 54 of the larger helical member. Appropriate needle bearings 56 are positioned in this gap. In place of needle bearings 56 other appropriate bearings could be used. Using the construction of FIG. 10 neither of the moving elements would need to be machined or hardened.

Figure 8:
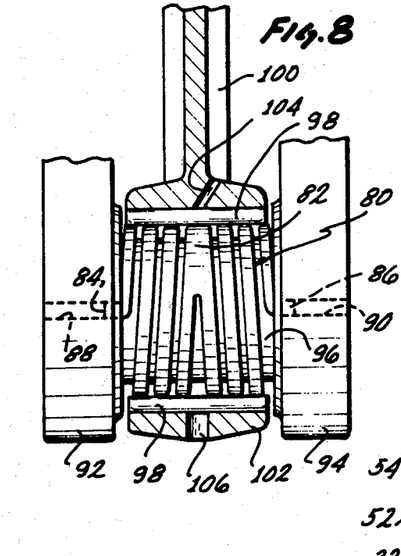
FIG. 8 is a side elevational view in partial section showing an alternate bi-directional helical member located on a portion of a crankshaft and including portions of a connecting rod attaching thereto.

In FIGS. 6 though 9 bi-directional helical members are illustrated. FIG. 6 shows a split bi-directional helical member whereas FIG. 8 shows a unified bi-directional helical member.

In FIG. 6 a first helical section 58 and a second helical section 60 are located around a journal surface 62 formed as a portion of crank element 64. The helical sections 58 and 60 differ from one another in that one revolves left handedly around the journal surface 62 while the other revolves right handedly around the journal surface 62. As such, they extend bi-directionally away from each other from about the center point of the journal surface 62. Located against the hardened outside surface 66 of helical section 58 and hardened outside surface 68 of section 60 is a needle bearing 70.

Needle bearing 70 would be one of a plurality of needle bearings which would be arranged in a typical array about the two helical sections 58 and 60 as previously described.

As is evident in FIG. 6 the helical sections 58 and 60 have been formed of round coil stock which as noted earlier results in rounded corners on both the internal (not separately identified or numbered) and external surfaces 66 and 68 of the helical sections 58 and 60.

On the left hand end of the helical section 58 is a tang 72 which projects along the axis of the journal surface 62. The tang 72 fits into an aperture 74 formed in the helical element 64. Interaction of the tang 72 in the aperture 74 prevents rotation of the first helical section 58 with respect to the journal surface 62. This locks the helical section 58 to the journal surface 62. The tang 72 is simply inserted into the aperture 74 when the helical section 58 is wound about the journal surface 62 as previously described.

As can be seen in FIG. 7 the second helical section 60 includes a tang 76 which fits into an aperture 78 formed directly in the journal surface 62. This locks the second helical section 60 against rotation about the journal surface 62 in a like manner. The tang 76 is perpendicular to the cylinderical axis of the journal 62. It is evident from reviewing FIGS. 6 and 7 that the appropriate tangs such as tangs 72 and 76 can be located either perpendicular to or coaxial with the axis of the journal 62 or some other angle in between. In any event interaction of the tangs such as tangs 72 and 76 with appropriately located aperatures such as apertures 74 and 78 prevent rotation of the helical sections such as helical sections 58 and 60 with respect to their journal surfaces such as journal surface 62. In addition, the two coil sections 58 and 60 would have an axial force along the journal surface 62 forcing the left hand section 58 to abut the right hand section 60. In a like manner, the uni-directional helical member 28 previously described could also be fitted with appropriate tangs to fixedly hold it with respect to rotation on the journal surface 26. As is evident from reviewing FIG. 5 the port 48 could be utilized as an appropriate aperture to interact with an appropriate tang on the helical member being passed there through.

Figure 9:
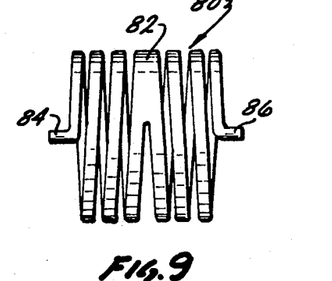
FIG. 9 is an elevational view of the helical member shown in FIG. 8.

In FIGS. 8 and 9 an integrally formed helical member 80 is shown. The helical member 80 is bi-directional with its left handed revolving coils joining to the right handed revolving coils at midpoint 82. The helical member 80 includes two tangs 84 and 86 on its respective ends which fit into appropriate apertures 88 and 90 formed in crank arms 92 and 94 respectively. As is seen in FIG. 8 the bi-directional unified helical member 80 fits around a journal surface 96 with appropriate bearings 98 located in an array around it. A connecting rod 100 and its rod cap 102 then fit around the outside of the bearings 98. However, the unified helical member 80 could be locked against rotation by a single tang or punched boss at the mid-point 82 of the member 80 with the single tang projecting into an appropriate aperture on the center periphery of the journal surface 96.

Both of the bi-directional helical members, i.e. the composite member, made up of sections 58 and 60 of FIG. 6 and the unified member 80 of FIG. 8 contribute to thorough lubrication of the bearings 98 as follows using the helical member 80 for illustrative purposes.

The helical member 80 contains both a left hand revolving section and a right hand revolving section which spiral toward one another at their midpoint 82.

As the totality of the structure shown in FIG. 8 revolves upon revolving of the crankshaft for which crank arms 92 an 94 form a part thereof, lubricant is entrapped in the spaces between the individual turns of the helical member 80. Since these individual turns spiral toward the mid-point 82, the lubricant is pumped toward this position. Upon arrival at the mid-point the lubricant can then be discharged by centrifugal action out of appropriate openings such as opening 104 in the connecting rod and opening 106 in the rod cap. It is evident that a positive lubrication flow is thus achieved from the crank arm 92 toward the openings 104 and 106.

In FIG. 8 the portion of the crankshaft shown which includes the crank arms 92 and 94 can be described as a closed end journal surface. It is evident that at both of the ends of the journal surface 96 the thickness of the materal of the crank arms 92 and 94 is greater than the diameter of the journal surface 96. Because of the spiral nature of the helical member 80 it acts as a compression spring and once the helical member 80 is located about the journal surface 96 the respective tangs 84 and 86 are displaced outwardly by the bias of the coil of the helical member 80 into the apertures 88 and 90 adjacent to the ends of the closed end journal surface 96.

I claim:

1. An apparatus for a low frictional connection between a first element rotating with respect to a second element which comprises:

said first element including a cylindrical convex journal surface;

said second element including a cylindrical concave receptacle surface;

said convex journal surface sized to fit into said concave receptacle surface and when fitting into said receptacle surface being spaced away from said receptacle surface;

a helical member having an internal concave helical surface and an external convex helical surface, each of said internal and said external helical surfaces forming portions of concentric right circular cylinders, said helical member sized to fit around said journal surface and within said receptacle surface;

said internal helical surface abutting against said journal surface, said external helical surface and said receptacle surface coaxial with each other and spaced away from each other forming a gap between each other;

a bearing means fitting into said gap and movably located against said helical member to provide a working connection between said first and said second elements, said bearing means and said helical member moving with respect to one another in response to rotational movement of said first and said second elements with respect to one another.

2. The apparatus of claim 1 wherein:

said cylindrical convex journal surface is a cylindrical closed end journal surface, said closed end journal surface being integrally formed as a portion of said first element with said first element at the respective ends of said closed journal surface being of a greater dimension than the diameter of said cylindrical closed end journal surface.

3. The apparatus of claim 2 wherein:

said closed end journal surface comprises a cylindrical surface located on a journal portion of a crankshaft;

said concave receptical surface comprises a surface located in a carriage rotatively mounted about said crankshaft.

4. The apparatus of claim 3 wherein:
said bearing means comprises roller bearing means located between said external helical surface of said helical member and said concave receptacle surface.

5. The apparatus of claim 4 wherein:
said roller bearings comprise needle bearings.

6. An apparatus for a low frictional connection between a first element rotating with respect to a second element which comprises:
said first element including a cylindrical convex journal surface;
said second element including a cylindrical concave receptacle surface;
said convex journal surface sized to fit into said concave receptacle surface and when fitting into said receptacle surface being spaced away from said receptacle surface;
a helical member having an internal concave helical surface and an external convex helical surface, each of said internal and said external helical surfaces forming portions of concentric right circular cylinders, said helical member sized to fit around said journal surface and within said receptacle surface;
said internal helical surface abutting against said journal surface, said external helical surface and said receptacle surface coaxial with each other and spaced away from each other forming a gap between each other;
a bearing means fitting into said gap and movably located against said helical member to provide a working connection between said first and said second elements, said bearing means and said helical member moving with respect to one another in response to rotational movement of said first and said second elements with respect to one another;
said cylindrical convex journal surface is a cylindrical closed end journal surface, said closed end journal surface being integrally formed as a portion of said first element and said first element at the respective ends of said closed journal surface being of a greater dimension than the diameter of said cylindrical closed end journal surface;
said closed end journal surface comprises a cylindrical surface located on a journal portion of a crankshaft;
said concave receptical surface comprises a surface located in a carriage rotatively mounted about said crankshaft;
said bearing means comprises a split cylindrical bushing bearing slidably rotating against said external surface of said helical member.

7. The apparatus of claim 6 wherein:
said first element includes an engagable means located hereon;
said helical member includes an engaging means integrally formed as a portion thereof, said engaging means engaging said engagable means to fixly retain said helical member against rotation on said journal surface.

8. The apparatus of claim 7 wherein:
said engagable means comprises aperture means located in said first element;
said engaging means comprises projecting means formed on said helical member, said projecting means fitting into said aperture means retaining said helical member against rotation on said journal surface.

9. The apparatus of claim 8 wherein:
said helical member is divided into a left handed revolution section and a right handed revolution section.

10. The apparatus of claim 9 wherein:
said aperture means comprises said first elememt inluding an aperture;
said projection means comprises said helical member having a tang, said tang sized and shaped so as to fit into said aperture.

11. An apparatus for a low frictional connection between a first element rotating with respect to a second element which comprises:
said first element including a cylindrical convex journal surface;
said second element including a cylindrical concave receptacle surface;
said convex journal surface sized to fit into said concave receptacle surface and when fitting into said receptacle surface being spaced away from said receptacle surface;
a helical member having an internal concave helical surface and an external convex helical surface, each of said internal and said external helical surfaces forming portions of concentric right circular cylinders, said helical member sized to fit around said journal surface and within said receptacle surface;
said internal helical surface abutting against said journal surface, said external helical surface and said receptacle surface coaxial with each other and spaced away from each other forming a gap between each other;
a bearing means fitting into said gap and movably located against said helical member to provide a working connection between said first and said second elements, said bearing means and said helical member moving with respect to one another in response to rotational movement of said first and said second elements with respect to one another;
a second helical member;
both said helical member and said second helical member having an internal concave helical surface and an external convex helical surface;
said helical member sized to fit around said journal surface and within said receptacle surface;
said second helical member sized to fit around said first helical member and within said receptacle surface;
said external helical surface of said second helical member abutting against said receptacle surface and said internal helical surface of said second helical member coaxial with and spaced away from said external helical surface of said helical member;
said internal helical surface of said helical member abutting against said journal surface positioning said external helical surface of said helical member coaxial with and spaced away from said internal helical surface of said second helical member forming a gap between the internal helical surface of said second helical member and the external helical surface of said helical member;

said bearing means fitting into said gap and movable with respect to both said helical member and said second helical member in response to rotational movement of said first and said second elements with respect to one another.

12. An apparatus for a low frictional connection between a first element rotating with respect to a second element which comprises:
   said first element including a cylindrical convex journal surface;
   said second element including a cylindrical concave receptacle surface;
   said convex journal surface sized to fit into said concave receptacle surface and when fitting into said receptacle surface being spaced away from said receptacle surface;
   a helical member having an internal concave helical surface and an external convex helical surface and said internal and said external helical surfaces form portions of concentric right circular cylinders, said helical member sized to fit around said journal surface and within said receptacle surface;
   said internal helical surface abutting against said journal surface, said external helical surface and said receptacle surface coaxial with each other and spaced away from each other forming a gap between each other;
   a bearing means fitting into said gap and movably located against said helical member to provide a working connection between said first and said second elements, said bearing means and said helical member moving with respect to one another in response to rotational movement of said first and said second elements with respect to one another;
   said first element includes an engagable means located hereon;
   said helical member includes an engaging means integrally formed as a portion thereof, said engaging means engaging said engagable means to fixly retain said helical member against rotation on said journal surface.

13. The apparatus of claim 12 wherein:
   said engagable means comprises aperture means located in said first element;
   said engaging means comprises projecting means formed on said helical member, said projecting means fitting into said aperture means retaining said helical member against rotation on said journal surface.

14. The apparatus of claim 13 wherein:
   said aperture means comprises said first element including an aperture;
   said projection means comprises said helical member having a tang, said tang sized and shaped so as to fit into said aperture.

15. The apparatus of claim 14 wherein:
   said cylindrical convex journal surface is a cylindrical closed end journal surface, said closed end journal surface being integrally formed as a portion of said first element with said first element at the respective ends of said closed journal surface being of a greater dimension than the diameter of said cylindrical closed end journal surface.

16. The apparatus of claim 15 wherein:
   said closed end journal surface comprises a cylindrical surface located on a journal portion of a crankshaft;
   said concave receptacle surface comprises a surface located in a carriage rotatively mounted about said crankshaft.

17. The apparatus of claim 16 wherein:
   said bearing means comprises roller bearing means located between said external helical surface of said helical member and said concave receptacle surface.

18. The apparatus of claim 16 wherein:
   said aperture is located in said journal surface.

19. The apparatus of claim 16 wherein:
   said aperture is located in one of the crank arms located adjacent to said journal surface.

20. An apparatus for a low frictional connection between a first element rotating with respect to a second element which comprises:
   said first element including a cylindrical convex journal surface;
   said second element including a cylindrical concave receptacle surface;
   said convex journal surface sized to fit into said concave receptacle surface and when fitting into said receptacle surface being spaced away from said receptacle surface;
   a helical member having an internal concave helical surface and an external convex helical surface and said internal and said external helical surfaces form portions of concentric right circular cylinders, said helical member sized to fit around said journal surface and within said receptacle surface;
   said internal helical surface abutting against said journal surface, said external helical surface and said receptacle surface coaxial with each other and spaced away from each other forming a gap between each other;
   a bearing means fitting into said gap and movably located against said helical member to provide a working connection between said first and said second elements, said bearing means and said helical member moving with respect to one another in response to rotational movement of said first and said second elements with respect to one another;
   said helical member is divided into a left handed revolution section and a right handed revolution section.

21. The apparatus of claim 20 wherein:
   said first element includes at last one aperture means located thereon;
   said helical member includes at least one projection means formed on said helical member, said projection means fitting into said aperture means retaining said helical member against rotation on said journal surface.

22. The apparatus of claim 21 wherein:
   said helical member including at least two of said projection means with at least one of said projection means located on each of said left and right handed revolution sections;
   said first element including a multiplicity of aperture means equal in number to said number of projection means.

23. The apparatus of claim 22 wherein:
   each of said projection means comprises a tang;
   each of said aperture means comprises an aperture located in said first element.

24. The apparatus claim 20 wherein:

said left handed revolution section and said right handed revolution section are integrally connected together.

25. The apparatus of claim 20 wherein:
said left handed revolution section and said right handed revolution section comprise individual sections of said helical member.

26. The apparatus of claim 25 wherein:
said first element includes at last one aperture means located thereon;
said helical member includes at least one projection means formed on said helical member, said projection means fitting into said aperture means retaining said helical member against rotation on said journal surface.

27. The apparatus of claim 26 wherein:
said aperture means comprises said first element including an aperture;
said projection means comprises said helical member having a tang, said tang sized and shaped so as to fit into said aperture.

28. The apparatus of claim 27 wherein:
said left handed revolution section and said right handed revolution section are integrally connected together.

29. The apparatus of claim 27 wherein:
said left handed revolution section and said right handed revolution section comprise individual sections of said helical member.

* * * * *

UNITED STATES PATENT AND TRADEMARK OFFICE
CERTIFICATE OF CORRECTION

PATENT NO. : 4,462,644
DATED : JULY 31, 1984
INVENTOR(S) : JACK S. CONNER

It is certified that error appears in the above-identified patent and that said Letters Patent is hereby corrected as shown below:

Column 1, line 33, "This" should be --Thus--.
Column 1, line 46, "of" should be --in--.
Column 1, line 58, "contract" should be --contact--.
Column 1, line 68, "resultent" should be --resultant--.
Column 3, line 19, "journed" should be --journal--.
Column 4, line 1, "di-directional" should be --bi-directional--.
Column 4, line 1, "bidirectional" should be --bi-directional--.
Column 4, line 31, "biderectional" should be --bi-directional--.
Column 4, line 24, "ilustrative" should be --illustrative--.
Column 5, line 19, "utilized" should be --utilizes--.
Column 5, line 33, "spefcification" should be --specification--.
Column 7, line 44, "embodiment" should be --method--.
Column 7, line 57, "It," should be --It is,--.

UNITED STATES PATENT AND TRADEMARK OFFICE
CERTIFICATE OF CORRECTION

PATENT NO. : 4,462,644

DATED : JULY 31, 1984

INVENTOR(S) : JACK S. CONNER

It is certified that error appears in the above-identified patent and that said Letters Patent is hereby corrected as shown below:

Column 8, line 2, "ambiguitied" should be --ambiguities--.
Column 8, line 22, "located" should be --locate--.
Column 8, line 25, "performed" should be --preformed--.
Column 11, line 45, "and" should be --with--.
Column 14, line 68, "apparatus claim" should be --apparatus of claim--.
Column 15, line 9, "last" should be --least--.

Signed and Sealed this

Fifth Day of March 1985

[SEAL]

*Attest:*

DONALD J. QUIGG

*Attesting Officer*       *Acting Commissioner of Patents and Trademarks*